(12) United States Patent
Takeda et al.

(10) Patent No.: US 6,612,477 B2
(45) Date of Patent: Sep. 2, 2003

(54) STRIP JOINING APPARATUS

(75) Inventors: Akimichi Takeda, Tokyo (JP); Shigeru Adachi, Tokyo (JP); Masaru Yoshida, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/067,290

(22) Filed: Feb. 7, 2002

(65) Prior Publication Data

US 2003/0015568 A1 Jan. 23, 2003

(30) Foreign Application Priority Data

Jul. 23, 2001 (JP) ........................... 2001-222162

(51) Int. Cl.⁷ ............................................. B23K 37/00
(52) U.S. Cl. ......................... 228/5.7; 228/13; 219/155
(58) Field of Search .............................. 228/13, 5.7, 25, 228/32, 47.1, 144, 155, 160, 170; 219/56, 57, 101, 102, 183, 155

(56) References Cited

U.S. PATENT DOCUMENTS

| | | | | |
|---|---|---|---|---|
| 2,120,316 A | * | 6/1938 | Stone | 228/5.7 |
| 2,143,969 A | * | 1/1939 | Biggert, Jr. | 228/125 |
| 3,225,999 A | * | 12/1965 | Heller et al. | 228/5.7 |
| 3,298,587 A | * | 1/1967 | Seeloff et al. | 228/5.7 |
| 3,700,157 A | * | 10/1972 | Shumaker | 228/5.7 |
| 3,771,215 A | * | 11/1973 | Wiliams et al. | 219/100 |
| 3,835,681 A | * | 9/1974 | Shumaker | 72/11.5 |
| 3,915,368 A | * | 10/1975 | Ulmer | 228/13 |
| 4,597,521 A | * | 7/1986 | Wilson | 228/160 |
| 4,765,532 A | * | 8/1988 | Uomoti et al. | 228/212 |
| 4,850,522 A | * | 7/1989 | Nichols | 228/159 |
| 5,182,428 A | * | 1/1993 | Jack et al. | 219/121.63 |
| 5,948,295 A | * | 9/1999 | Perret et al. | 219/125.1 |
| 5,992,726 A | * | 11/1999 | Shaffer | 228/5.7 |
| 6,213,381 B1 | * | 4/2001 | Funamoto et al. | 228/141.1 |
| 6,491,210 B1 | * | 12/2002 | Suzuki | 228/170 |

FOREIGN PATENT DOCUMENTS

JP 59-21481 B2 8/1990

OTHER PUBLICATIONS

Patent Abstract of Japan 59–021481, Feb. 3, 1984.

* cited by examiner

*Primary Examiner*—Tom Dunn
*Assistant Examiner*—Colleen P. Cooke
(74) *Attorney, Agent, or Firm*—Sughrue Mion, PLLC

(57) ABSTRACT

A strip joining apparatus is provided wherein a time which a line is stopped is shortened, a number of installation spaces is decreased and precise notching may be performed. The strip joining apparatus comprising a first carriage 3 comprising a shearing means 8 for shearing each of the back end of the preceding strip 1a and the lead end of the succeeding strip 1b in a direction approximately orthogonal to the traveling direction of the strips, a welding means 15 for sequentially welding, along a shearing surface, a location where the back end of the sheared preceding strip 1a and the lead end of the sheared succeeding strip 1b are contacted by abutting or overlapping, and a first side notching means 18 for side notching a weld lead end portion of the weld location provided extending approximately above a weld traveling direction of the weld location, the first carriage 3 provided so as to be capable of moving in the weld traveling direction; and a second carriage 6 disposed facing the first carriage 3 and comprising a second side notching means 19 for side notching a weld back end portion of the weld location and constituting a pair together with the first side notching means 18.

3 Claims, 11 Drawing Sheets

STRIP JOINING APPARATUS

This application is based on Application No. 2001-222162, filed in Japan on Jul. 23, 2001, the contents of which are hereby incorporated by reference.

BACKGROUND OF THE INVENTION

1. Field of the Invention

The present invention relates to improvement of a strip joining apparatus in which a back end of a preceding strip and a lead end of a succeeding strip are butt welded or lap welded and then a lead end of the weld location and a lead end of the weld location are notched.

2. Description of the Related Art

In recent years, there have been various improvements of a steel sheet continuous processing apparatus in a steel sheet processing line with an aim to increase productivity, reduce site space, and improve quality stability and yield. Furthermore, in the above strip joining apparatus, one proposition for the processing line has been to drastically shortening a time which the line is stopped when a back end of a preceding strip and a lead end of a succeeding strip are welded and a weld lead end portion and weld lead end portion are notched at an entrance of the steel processing line.

As an apparatus for resolving such a problem, for example, the apparatus disclosed in Japanese Patent Publication Hei 2-38288 may be given. In this apparatus, a welding position and a side notching position are separated a predetermined distance in a traveling direction of the sheet.

That is, after welding, the strip is first moved only a predetermined distance in the traveling direction and then side notching is performed.

FIG. 16 is an explanatory drawing explaining the apparatus disclosed in Japanese Patent Publication Hei 2-38288. The upper portion in FIG. 16 shows the apparatus from above while the lower portion shows the apparatus from the side. As to strips 1, there is a preceding strip 1a and a succeeding strip 1b. The strips 1 travel in the direction of the arrow C in the drawing. A welding apparatus 35 for welding and a side notching apparatus 36 for side notching are separated in the traveling direction by only a distance L. The side notching apparatus 36 includes a pair of side notching apparatuses 18, 19.

A conventional strip joining apparatus constructed in such a manner entails the following problems. Namely, a. Because the welding apparatus 35 and side notching apparatus 36 are disposed in tandem in the traveling direction, a long line control period is required to travel the strip to a notching position after it is welded. That is, there is a long period of time from when movement of the strip is halted→welding is performed→the strip is moved→, until, notching is completed. Generally, when the line is stopped a long time for welding, the system has a major drawback in that a the size of a looper apparatus for storing strips increases. This is because strips are continuously processed even when a strip is stopped and welded at the entrance side. Hence, the looper apparatus must be able to handle an anticipated capacity when a strip is stopped.

b. Since the welding apparatus and the side notching apparatus are disposed separated in the traveling direction, multiple positioning spaces are required.

c. Because the strip is moved from the welding position to a notching position by means of line control, there is a lot of variation in stopping the movement of the strips (normally a variation of ±60 mm occurs) and precise notching cannot be performed.

SUMMARY OF THE INVENTION

The present invention aims to solve the above problems and an object of the present invention is to provide a strip joining apparatus in which, a time which a line is stopped is shortened, a number of installation spaces is decreased and precise notching is performed.

According to one aspect of the present invention there is provided a strip joining apparatus being a welding system wherein a back end of a preceding strip and a lead end of a succeeding strip are welded while sheet-shaped strips are traveled in a longitudinal direction and both ends of a weld location are side notched after welding, comprising, a first carriage comprising a shearing means for shearing each of the back end of the preceding strip and the lead end of the succeeding strip in a direction approximately orthogonal to the traveling direction of the strips, a welding means for sequentially welding, along a shearing surface, a location where the back end of the sheared preceding strip and the lead end of the sheared succeeding strip are contacted by abutting or overlapping, and a first side notching means for side notching a weld lead end portion of the weld location provided extending approximately above a weld traveling direction of the weld location, the first carriage provided so as to be capable of moving in the weld traveling direction, and a second carriage disposed facing the first carriage and comprising a second side notching means for side notching a weld back end portion of the weld location and constituting a pair together with the first side notching means.

According to another aspect of the present invention there is provided a strip joining apparatus being a welding system wherein a back end of a preceding strip and a lead end of a succeeding strip are welded while sheet-shaped strips are traveled in a longitudinal direction and both ends of a weld location are side notched after welding, comprising, a first carriage comprising a shearing means for shearing each of the back end of the preceding strip and the lead end of the succeeding strip in a direction approximately perpendicular to the traveling direction of the strips, and a first side notching means for side notching a weld lead end portion of the weld location provided extending approximately above a shearing surface of the sheared strip, the first carriage provided so as to be capable of moving in a direction of the shearing surface, a welding means provided separately from the first carriage and between the shearing means and the first side notching means, for sequentially welding a location where the back end of the sheared preceding strip and the lead end of the sheared succeeding strip are contacted by abutting or overlapping while moving parallel to the shearing surface, and a second carriage disposed facing the first carriage and comprising a second side notching means for side notching a weld back end portion of the weld location and constituting a pair together with the first side notching means.

According to still another aspect of the present invention the shearing apparatus comprises a punching means for punching said strip concurrently with a shearing operation of said strip at a position separated a predetermined distance from a shearing position.

According to yet another aspect of the present invention, the welding means is laser beam welding.

According to still yet another aspect of the present invention, the welding means is seam welding.

According to still yet another aspect of the present invention, the welding means is arc welding.

DETAILED DESCRIPTION OF THE PREFERRED EMBODIMENTS

Embodiment 1

Figure 1:
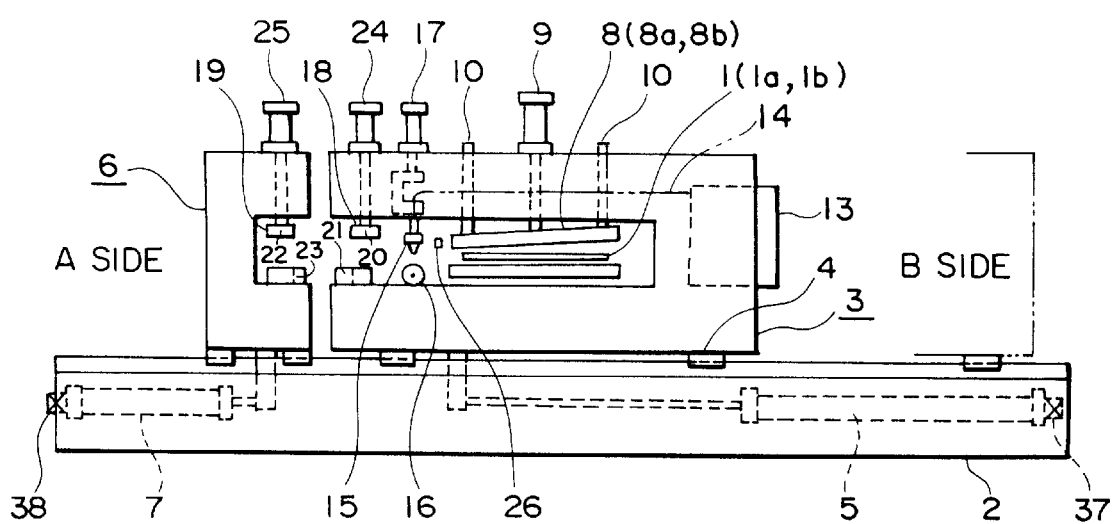
FIG. 1 is a side elevational view showing a strip joining apparatus according to Embodiment 1 of the present invention in a position where it has returned to origin.
Figure 2:
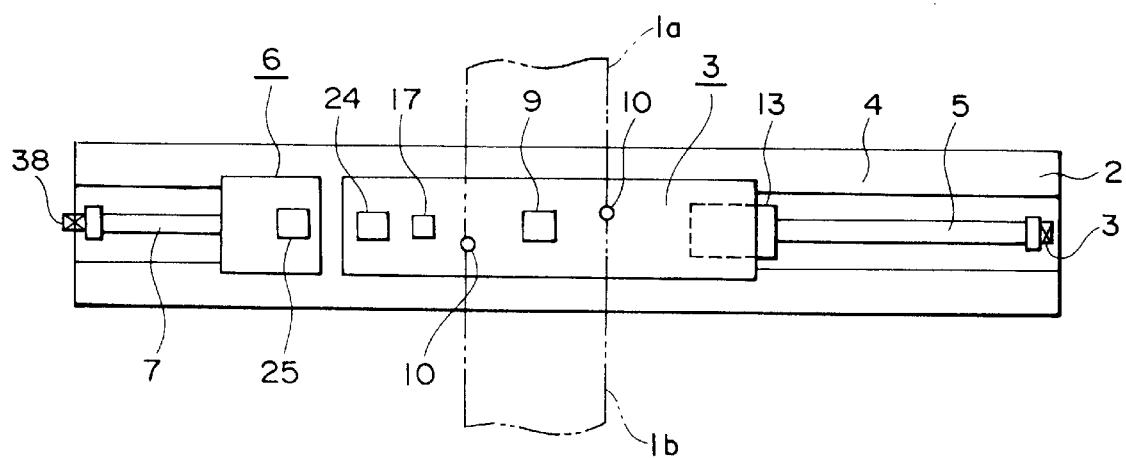
FIG. 2 is a plan view of the strip joining apparatus according to Embodiment 1.
Figure 3:
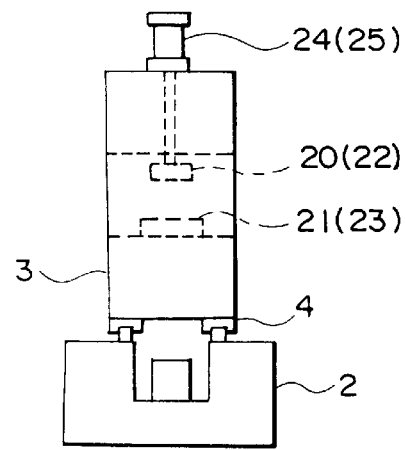
FIG. 3 is a front view of the strip joining apparatus according to Embodiment 1.
Figure 4:
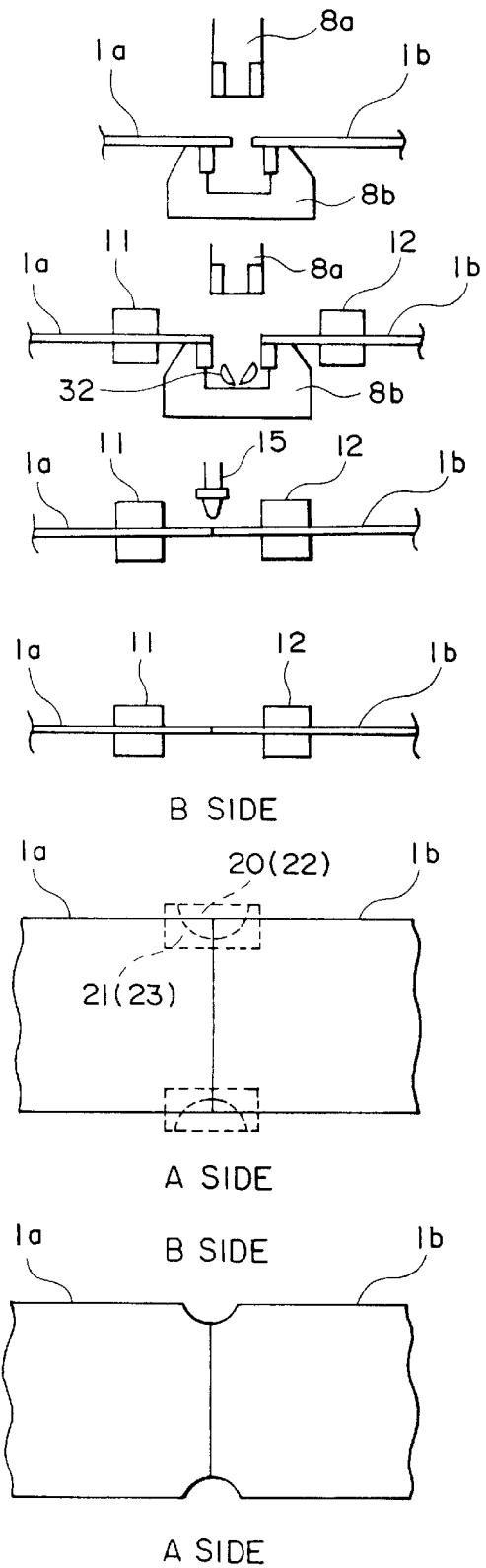
FIG. 4 is a process drawing for explaining various processes performed in the welding and side notching of Embodiment 1.
Figure 5:
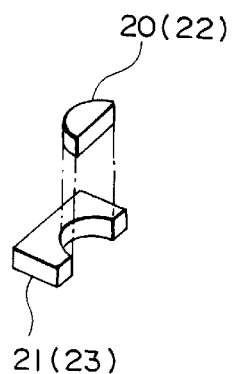
FIG. 5 is a perspective view showing one example of a cutting shape of a side notching means.
Figure 6:
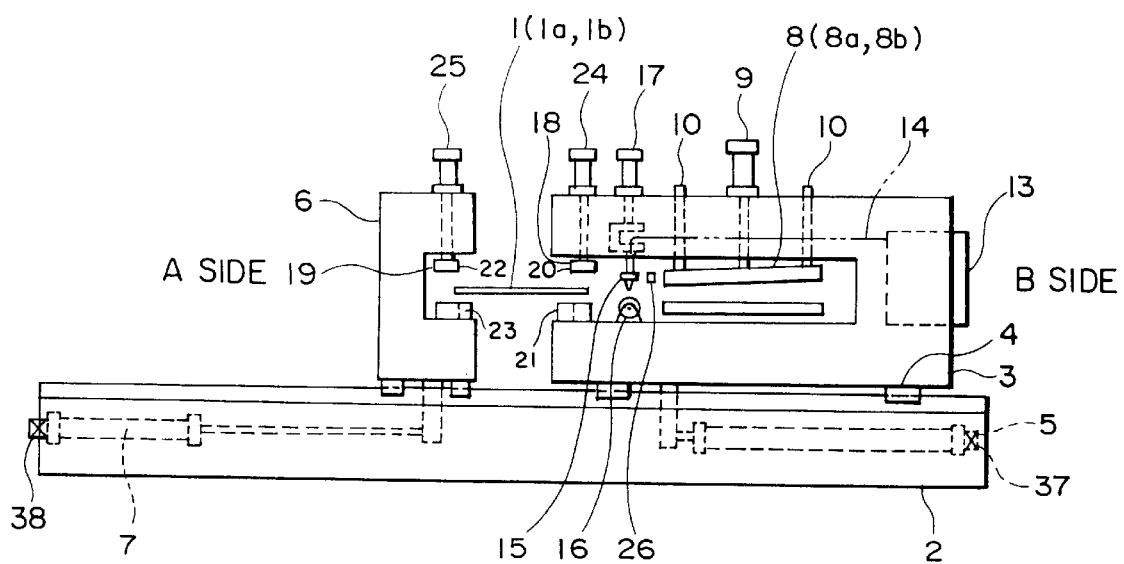
FIG. 6 is a side elevational view showing a positional condition in a side notching state after welding has been completed.

FIG. 1 is a side elevational view showing a strip joining apparatus according to Embodiment 1 of the present invention in a position where it has returned to origin. FIG. 2 is a plan view of the strip joining apparatus according to Embodiment 1. FIG. 3 is a front view of the strip joining apparatus according to Embodiment 1. FIG. 4 is a process drawing for explaining various processes performed in the welding and side notching of Embodiment 1. FIG. 5 is a perspective view showing one example of a cutting shape of a side notching means. FIG. 6 is a side elevational view showing a positional condition in a side notching state after welding has been completed.

In the present embodiment, long tin sheet-shaped strips 1 are traveled in a direction orthogonal to the surface of the page of FIG. 1 and from the bottom of the page to the top of the page in FIG. 2.

In FIGS. 1 to 6, a back end of a preceding strip 1a and a lead end of a succeeding strip 1b are welded. A guide rail 4 is mounted in a longitudinal direction on a common base 2. A carriage 3 as a first carriage and a side notching carriage 6 as a second carriage are mounted to the guide rail 4 and are capable of moving back and forth in the longitudinal direction of the common base 2. The carriage 3 and side notching carriage 6 are disposed facing an entrance portion and are capable of moving independently. A carriage feeding mechanism 5 and a side notching feeding mechanism 7, a ball screw for example, are connected to the carriage 3 and side notching carriage 6, respectively, in the longitudinal direction of the common base 2.

A shearing apparatus 8 as a shearing means (including an upper shear 8a and a lower shear 8b), an upper shear elevator cylinder 9 and an upper shear guide 10 are mounted to the carriage 3 as a first carriage. A processing head 15 as a welding means is further mounted to the carriage 3. A laser oscillator 13 is connected to the processing head 15 and a laser beam 14 transmitted from the laser oscillator 13 is discharged from the processing head 15 and irradiated on the strip 1. A back bar 16 for catching the irradiated beam is provided in a position facing the processing head 15. The processing head 15 is positioned in an appropriate position relative to the strip 1 by means of a processing head elevator mechanism 17.

A B-side side notching apparatus 18 as a first side notching means is further mounted to the carriage 3. This B-side side notching apparatus 18 comprises a B-side side notching upper blade 20, a B-side side notching lower blade 21 and a B-side side notching elevator cylinder 24. The B-side side notching apparatus 18 side notches a weld lead end portion. The shearing apparatus 8, processing head 15 and B-side side notching apparatus 18 on the carriage 3 are all provided on the same axis in the longitudinal direction of the carriage 3. A strip position transducer 26 for detecting an end of the strip 1 is further mounted on the carriage 3.

On the other hand, an A-side side notching apparatus 19 as a second side notching means and which constitutes a pair together with the B-side side notching apparatus 18 is mounted on a side notching carriage 6 which is a second carriage. This A-side side notching apparatus 19 comprises an A-side side notching upper blade 22, an A-side side notching lower blade 23 and an A-side side notching elevator cylinder 25.

Next, various processes performed in welding and side notching will be explained in order with reference to FIG. 4. In FIG. 4, clamp devices 11, 12 clamp the strip 1. Although the clamp devices 11, 12 are not shown in FIG. 1 and FIG. 2, each is provided at both sides of the carriage 3 and the side notching carriage 6. That is, (although not shown) they are provided at an upper and lower side of FIG. 2, respectively.

In FIG. 4, first, a preceding strip 1a and a succeeding strip 1b are stopped in the shearing apparatus 8. Then, the exit-side clamp 11 and the entrance-side clamp 12 clamp the preceding strip 1a and succeeding strip 1b, respectfully. Next, a butt end of the preceding strip 1a and a lead end of the succeeding strip 1b are sheared by the shearing apparatus 8. Scrap 32 sheared by the shearing apparatus 8 falls away.

The entrance-side clamp 12 clamp moves toward the exit-side clamp 11 side and abuts the sheared strip ends. A hydraulic mechanism, for example, may be used as a moving mechanism of the entrance-side clamp 12.

The processing head 15 moves from one end to another above this abutting line and the abutting portion is welded by means of an irradiated laser beam. After welding, a welding start position (B-side) and a welding finish position are cut by the B-side side notching apparatus 18 and the A-side side notching apparatus 19, respectfully, and fall away.

Next, movement of the apparatuses performing the various processes of welding and side notching will be explained. FIG. 1 shows the positional state of the apparatus when the strips 1 are traveling.

(1) First, the strips 1 are sheared by the shearing apparatus 8 in the position of FIG. 1.

(2) Next, the carriage 3 is traveled by means of the carriage feeding mechanism 5 toward the B-side, the right in FIG. 1.

(3) The processing head 15 drops while the carriage 3 is traveling.

(4) The processing head commences laser welding while the carriage is traveling when the strip position transducer 26 detects the ends of the strips 1.

(5) Then, laser welding is completed when the strip position transducer 26 detects a weld completion position of the strips 1.

Moreover, a position of the carriage 3 when it is traveling is detected by a carriage position transducer 37. Similarly, a position of the side notching apparatus 6 is also detected by means of a side notching position transducer 38.

(6) The side notching carriage 6 also moves to the B-side as the carriage 3 moves to the B-side. (It moves as though it is following the carriage 3.)

(7) The B-side side notching apparatus 18 quickly moves to the B-side end surface of the strip 1 when welding is complete. (it quickly moves to a notching position in accordance with positional information of the carriage position transducer 37.)

(8) Furthermore, The A-side side notching apparatus also quickly moves to the A-side end surface of the strip 1 when welding is complete. (it quickly moves to a notching position in accordance with positional information of the carriage position transducer 37 and the side notching position transducer 38.)

(9) Then, side notching is performed in accordance with operation of the B-side side notching elevator cylinder 24 and A-side side notching elevator cylinder 25.

FIG. 6 shows a positional state of the strip 1 during side notching of the weld front end portion and the weld back end portion.

Accordingly, in the strip joining apparatus of the present embodiment, after welding is completed, it is possible to complete notching at that position in a short time, without moving the strip 1 in the traveling direction.

That is to say, the strip joining apparatus in accordance with the present embodiment, being a welding system wherein the back end of a preceding strip 1a and the lead end of the succeeding strip 1b are welded while sheet-shaped strips 1 are traveled in a longitudinal direction and both ends of the weld location are side notched after welding, comprises, the carriage 3 as a first carriage comprising the shearing apparatus 8 as a shearing means for shearing each of the back end of the preceding strip 1a and the lead end of the succeeding strip 1b in a direction approximately orthogonal to the traveling direction of the strips, the processing head 15 as a welding means for sequentially welding, along the shearing surface, the location where the back end of the sheared preceding strip (1a) and the lead end of the sheared succeeding strip (1b) are contacted by abutting or overlapping, and the B-side side notching apparatus 18 as a first side notching means for side notching the weld lead end portion of the weld location provided extending approximately above the weld traveling direction of the weld location, the carriage 3 provided so as to be capable of moving in the weld traveling direction; and the carriage 6 as a second carriage disposed facing the carriage 3 and comprising the A-side side notching apparatus 19 as a second side notching means for side notching the weld back end portion of the weld location and constituting a pair together with the B-side side notching apparatus 18.

Thus, a time which the line is stopped may be shortened, a number of installation spaces in the traveling direction may be decreased and precise notching may be performed.

Also, in the strip joining apparatus of the present embodiment, the welding means is laser beam welding. Hence, it is possible to perform precise welding with a narrow weld width and without a broad weld location, and the time which the line is stopped may be shortened because welding is completed in a short period of time.

Moreover, although the laser oscillator 13 is mounted to the carriage 13, the laser oscillator 13 may also be disposed at a location other than the carriage 13.

Furthermore, in the present embodiment, although laser beam welding is used as the welding means, arc welding may also be used to exhibit similar effects.

Embodiment 2

Figure 7:
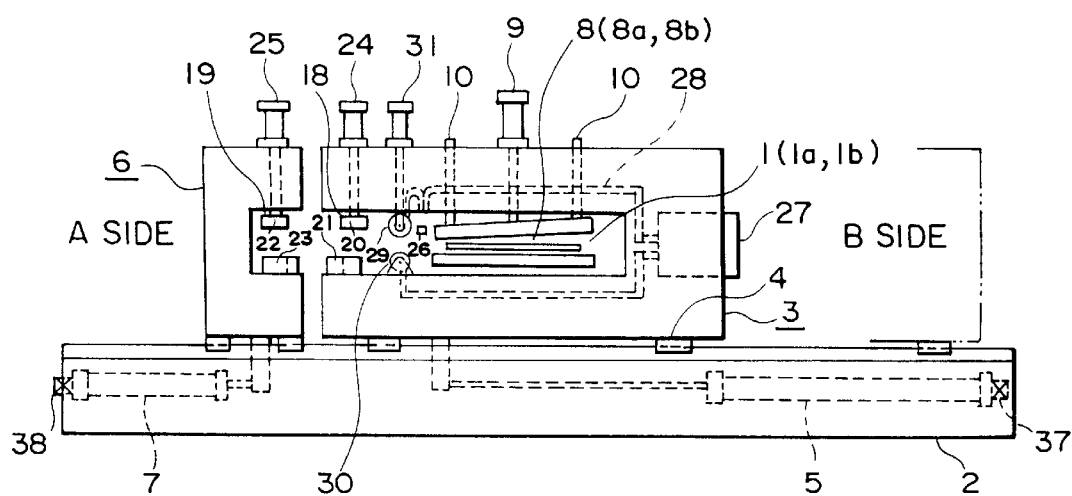
FIG. 7 is a side elevational view showing a strip joining apparatus according to Embodiment 2 of the present invention in a position where it has returned to origin.
Figure 8:
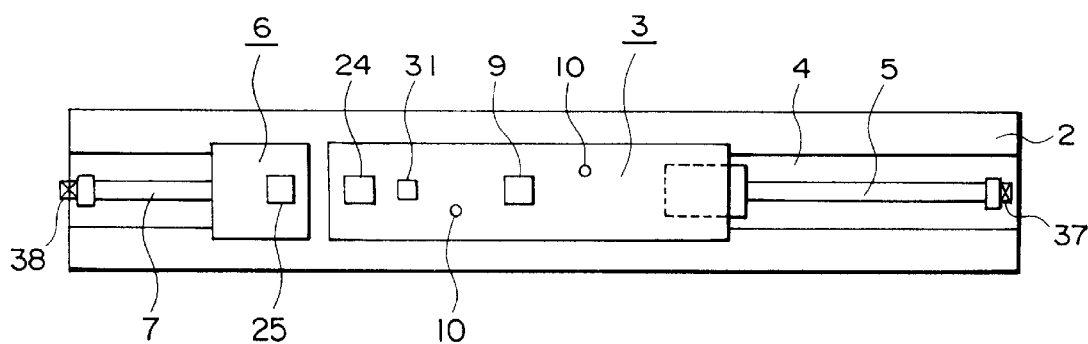
FIG. 8 is a plan view of the strip joining apparatus according to Embodiment 2.
Figure 9:
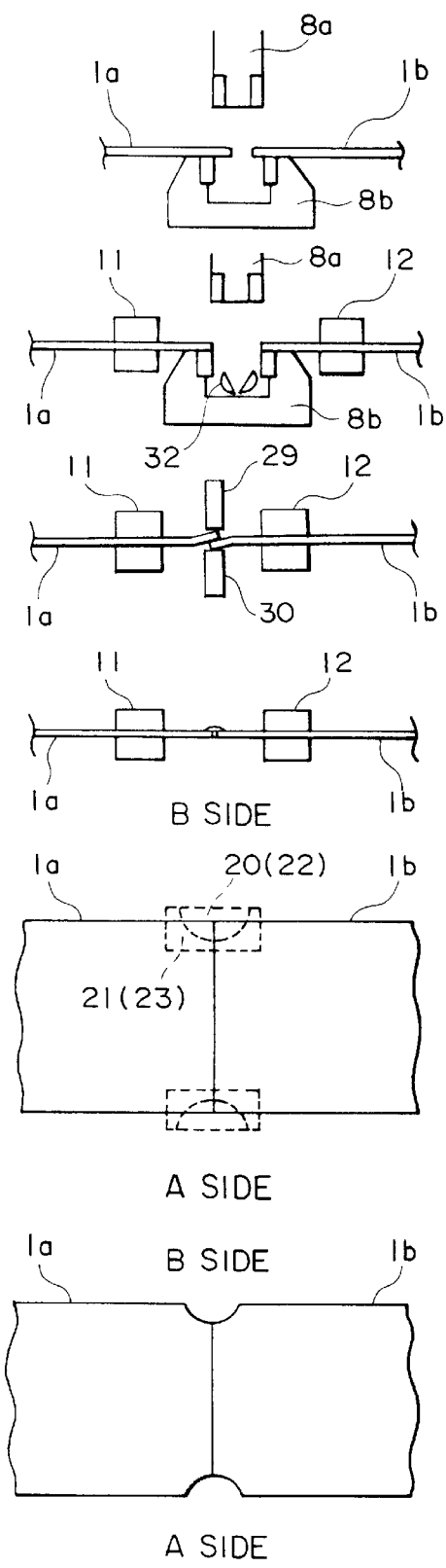
FIG. 9 is a process drawing for explaining various processes performed in the welding and side notching of Embodiment 2.
Figure 10:
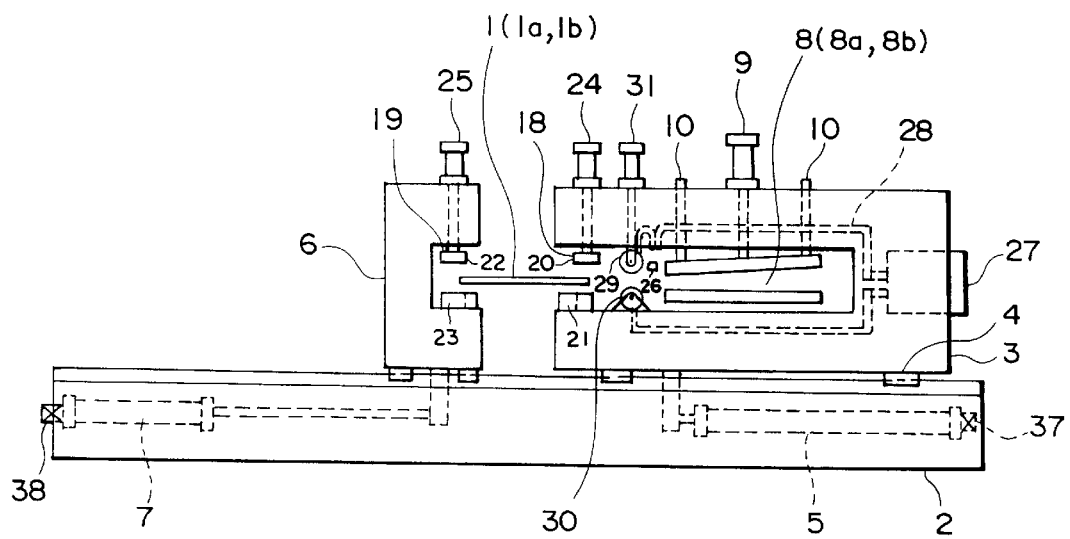
FIG. 10 is a side elevational view showing a positional condition in a side notching state after welding has been completed.

FIG. 7 is a side elevational view showing a strip joining apparatus according to Embodiment 2 of the present invention in a position where it has returned to origin. FIG. 8 is a plan view of the strip joining apparatus according to Embodiment 2. FIG. 9 is a process drawing for explaining various processes performed in the welding and side notching of Embodiment 2. FIG. 10 is a side elevational view showing a positional condition in a side notching state after welding has been completed.

Although the basic construction of the present embodiment is similar to Embodiment 1, the welding means is different. The welding means of the present embodiment is seam welding. In the present invention, a back end of the preceding strip 1a and a lead end of a succeeding strip 1b are overlapped only a predetermined length and welded. Electric power necessary for welding is feed to an upper electrode disk 29 (welding means) and a lower electrode disk 30 (welding means) via a welding transformer 27 and secondary conductor 28. The overlapping portion of the strips is pressed by means of an electrode force mechanism 31 and sandwiched between the upper electrode disk 29 and lower electrode disk 30, and is welded in accordance with movement of the carriage 3.

Other constructions are the same as in Embodiment 1.

Accordingly, in the strip joining apparatus of the present embodiment, the welding means is a seam welding. Thus, the back end of the preceding strip 1a and the lead end of a succeeding strip 1b are overlapped and welded and the weld is ensured.

Embodiment 3

Figure 11:
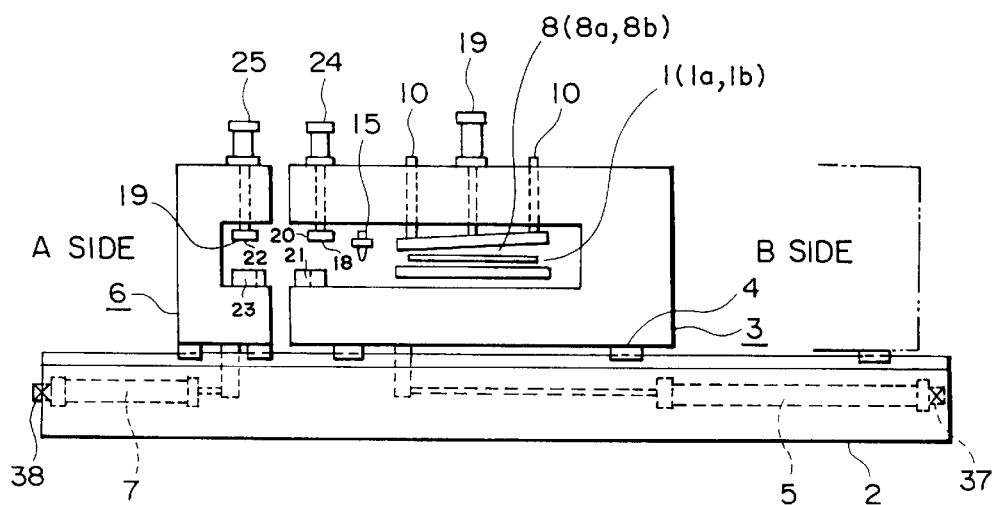
FIG. 11 is a side elevational view showing a strip joining apparatus according to Embodiment 3 of the present invention in a position where it has returned to origin.
Figure 12:
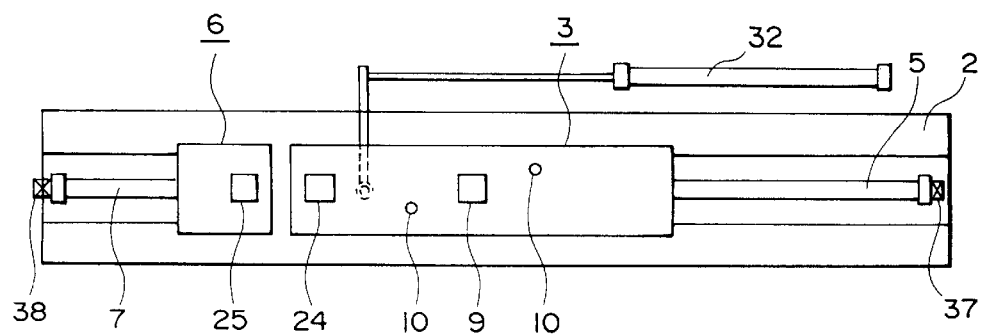
FIG. 12 is a plan view of the strip joining apparatus according to Embodiment 3.
Figure 13:
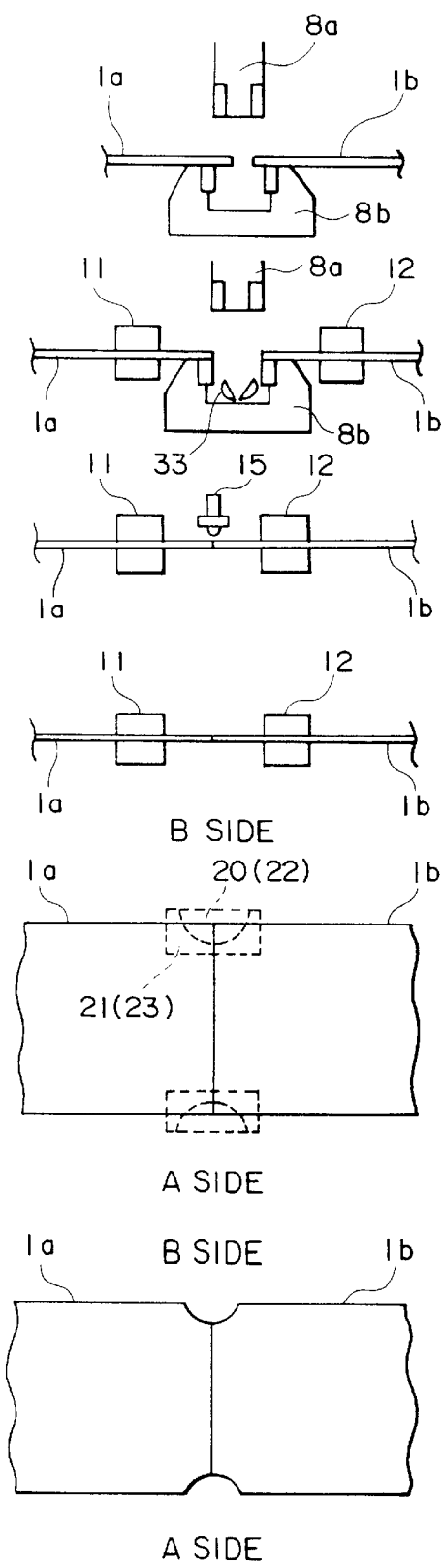
FIG. 13 is a process drawing for explaining various processes performed in the welding and side notching of Embodiment 3.

FIG. 11 is a side elevational view showing a strip joining apparatus according to Embodiment 3 of the present invention in a position where it has returned to origin. FIG. 12 is a plan view of the strip joining apparatus according to Embodiment 3. FIG. 13 is a process drawing for explaining various processes performed in the welding and side notching of Embodiment 3.

In the present embodiment, the processing head 15 as a welding means is not mounted to the carriage 3, but supported and driven from another location. That is, the processing head 15 is supported by means of a processing head driving mechanism 32, and is also driven by means of the processing head driving mechanism 32.

That is to say, the strip joining apparatus of the present embodiment, being a welding system wherein the back end of the preceding strip 1*a* and the lead end of the succeeding strip 1*b* are welded while sheet-shaped strips 1 are traveled in a longitudinal direction and both ends of the weld location are side notched after welding, comprises, the carriage 3 as a first carriage comprising the shearing apparatus 8 as a shearing means for shearing each of the back end of the preceding strip 1*a* and the lead end of the succeeding strip 1*b* in a direction approximately perpendicular to the traveling direction of the strips, and the B-side side notching apparatus 18 as a first side notching means for side notching the weld lead end portion of the weld location provided extending approximately above the shearing surface of the sheared strip, the carriage 3 provided so as to be capable of moving in a direction of the shearing surface, the processing head 15 as a welding means provided separately from the carriage 3 and between the shearing apparatus 8 and the B-side side notching means 18, for sequentially welding the location where the back end of the sheared preceding strip 1*a* and the lead end of the sheared succeeding strip 1*b* are contacted by abutting or overlapping while moving parallel to the shearing surface, and the side notching carriage 6 as a second carriage disposed facing the carriage 3 and comprising the A-side side notching apparatus 19 as a second side notching means for side notching the weld back end portion of the weld location and constituting a pair together with the B-side side notching apparatus 18.

Hence, a time which the line is stopped may be shortened, a number of installation spaces in the traveling direction may be decreased and precise notching may be performed, and the welding means does not receive any adverse influence because mechanical vibration occurring during operation of the shearing means does not extend to the welding means.

Embodiment 4

Figure 14:
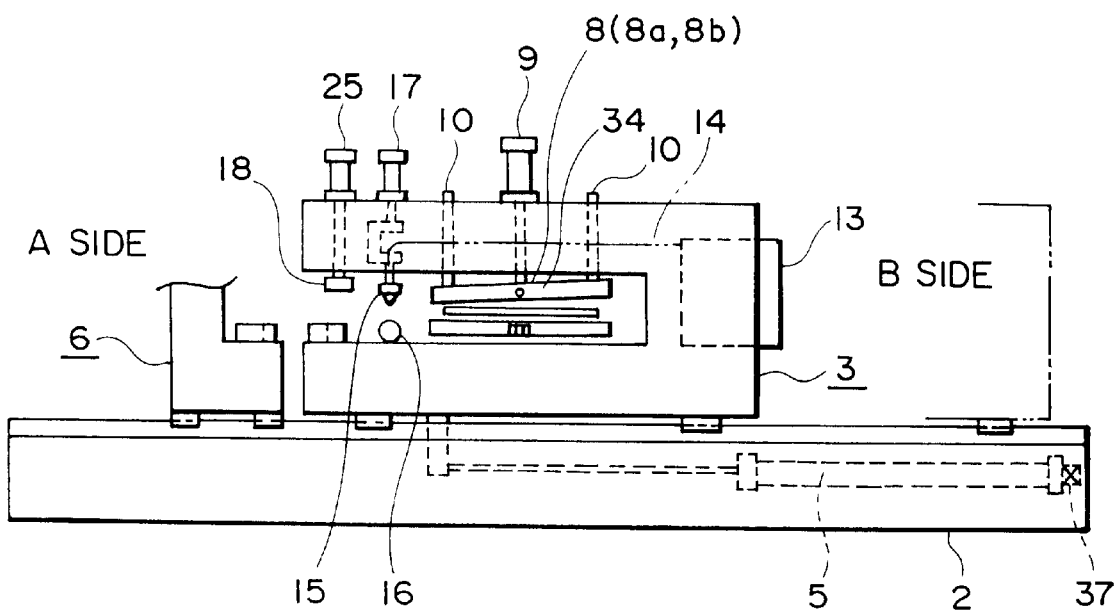
FIG. 14 is a side elevational view of a strip joining apparatus according to Embodiment 4 of the present invention.
Figure 15:
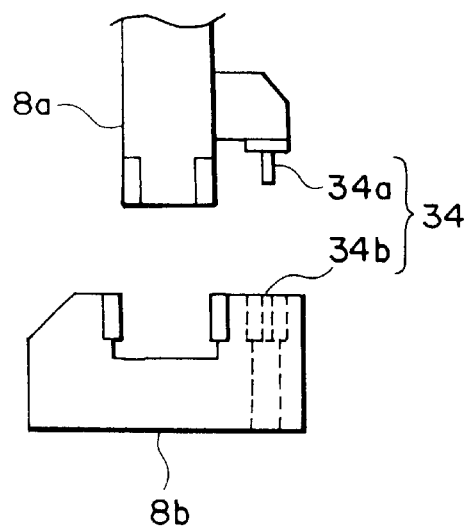
FIG. 15 is an enlarged side elevational view of an essential portion of a punching apparatus.
Figure 16:
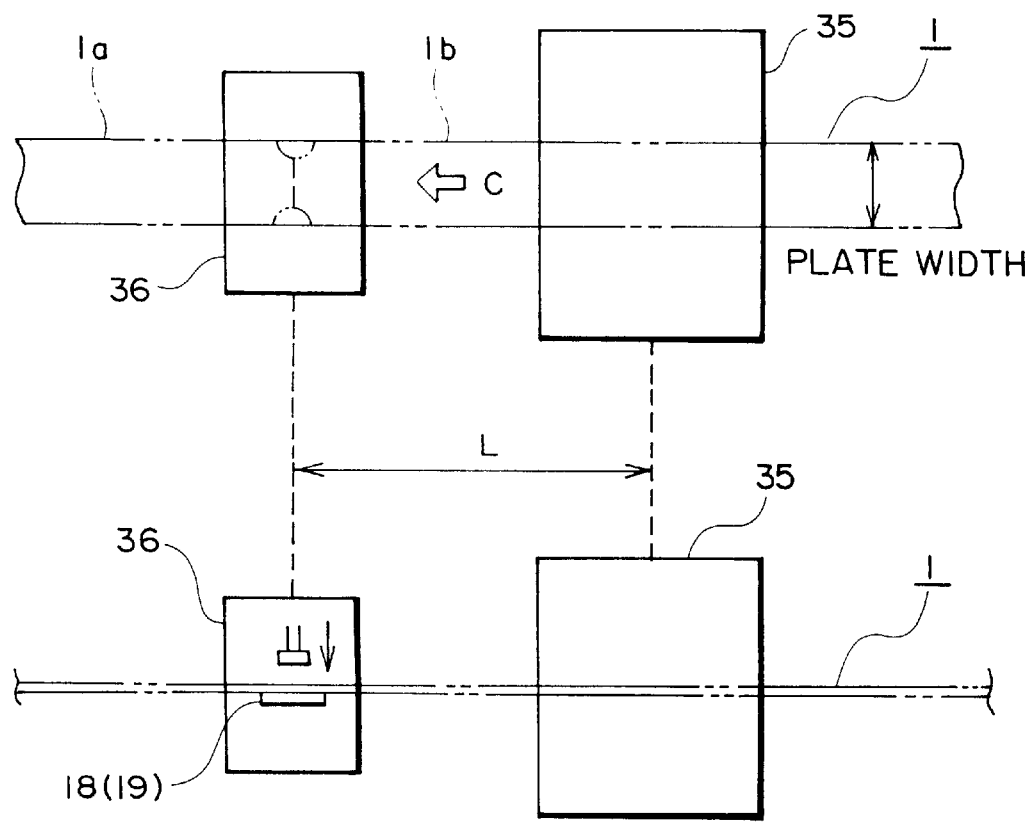
FIG. 16 is a drawing for explaining sample constructions of a conventional welding apparatus and notching apparatus.

FIG. 14 is a side elevational view of a strip joining apparatus according to Embodiment 4 of the present invention. FIG. 15 is an enlarged side elevational view of an essential portion of a punching apparatus. In a continuous processing line, a weld portion is detected in an after process, and there is a case where a hole is processed in a vicinity of the weld portion to be used as a marker for shearing away the portion or for control.

In the present embodiment, a punching apparatus 34 as a punching means is provided to the shearing apparatus 8 as a shearing means. That is, a punch 34*a* is provided at an upper shear 8*a* of the shearing apparatus 8, and a die 34*b* is provided at a lower shear 8*b*. The punching apparatus 34 comprises the punch 34*a* and the die 34*b*. Because of this structure, a punching operation of the punching apparatus 34 is performed concurrently with a shearing operation of the shearing apparatus 8.

Accordingly, in the strip joining apparatus of the present embodiment, the shearing apparatus 8 as a shearing means comprises a punching apparatus as a punching means for punching the strip 1 concurrently with the shearing operation of the strip 1 at a position separated a predetermined distance from the shearing position. Thus, it is possible to process the hole, which is necessary for detecting the weld portion in an after process, concurrently with the shearing operation, and a time which the line is stopped may be shortened and, at the same time, a number of installation spaces may be reduced and it is possible to make cost reductions.

Moreover, in the present embodiment, although the punch 34*a* is provided on the upper shear 8*a*, conversely, the die 34*b* may also be provided on the upper shear 8*a*.

Also, although the punching apparatus 34 of the present invention is constructed to work together with the shearing apparatus, predetermined similar effects may also be exhibited in a method where, by mounting the upper punch 34*a* to actuator and the like (not shown), punching is done at a predetermined timing without working together with the shearing apparatus 8.

The present invention is constructed in the above manner, thus, welding and side notching may be completed quickly and precisely without moving the strip. Furthermore, since the welding means and side notching means are combined, the installation space is narrowed in the traveling direction and a space saving apparatus may be provided.

Namely, in the strip joining apparatus of the present invention.

a. Because the welding means and side notching means are a composite construction, there is no need of a line control time for traveling the strip to the notching position after welding. That is, the time from when movement of the strip is halted→welding is performed→the strip is moved→, until, notching is completed may be shortened. Accordingly, the effects are such that the looper apparatus for storing the strips may be decreased in size, and of course the equipment cost of the looper is lowered, and installation space is also decreased.

b. Since the welding means and side notching means are a composite construction, it is possible to decrease the installation space in the traveling direction.

c. Because the strip is not moved from the welding position to the notching position by means of line control, the welding position and notching position correspond to one another and precise notching may be performed.

d. The looper apparatus advantageously has a small capacity, the installation space is decreased in the direction of the line, the welding apparatus is made compact by making it a composite construction, and the like. Thus, it is possible to provide inexpensive strip joining with a small investment in equipment.

The strip joining apparatus according to the present invention, being a welding system wherein the back end of a preceding strip and the lead end of the succeeding strip are welded while sheet-shaped strips are traveled in a longitudinal direction and both ends of the weld location are side notched after welding, comprises, the first carriage comprising the shearing means for shearing each of the back end of the preceding strip and the lead end of the succeeding strip in a direction approximately orthogonal to the traveling direction of the strips, the welding means for sequentially welding, along the shearing surface, the location where the back end of the sheared preceding strip and the lead end of the sheared succeeding strip are contacted by abutting or overlapping, and the first side notching means for side notching the weld lead end portion of the weld location provided extending approximately above the weld traveling direction of the weld location, the first carriage provided so as to be capable of moving in the weld traveling direction, and the second carriage disposed facing the first carriage and comprising the second side notching means for side notching the weld back end portion of the weld location and constituting a pair together with the first side notching means.

Thus, a time which the line is stopped may be shortened, a number of installation spaces in the traveling direction may be decreased and precise notching may be performed.

Also, another strip joining apparatus according to the present invention, being a welding system wherein the back end of the preceding strip and the lead end of the succeeding strip are welded while sheet-shaped strips are traveled in a longitudinal direction and both ends of the weld location are side notched after welding, comprises, the first carriage comprising the shearing means for shearing each of the back end of the preceding strip and the lead end of the succeeding strip in a direction approximately perpendicular to the traveling direction of the strips, and the first side notching means for side notching the weld lead end portion of the weld location provided extending approximately above the shearing surface of the sheared strip, the first carriage provided so as to be capable of moving in a direction of the shearing surface, the welding means provided separately from the first carriage and between the shearing apparatus and the first side notching means, for sequentially welding the location where the back end of the sheared preceding strip and the lead end of the sheared succeeding strip are contacted by abutting or overlapping while moving parallel to the shearing surface, and the second carriage disposed facing the first carriage and comprising the second side notching means for side notching the weld back end portion of the weld location and constituting a pair together with the first side notching means.

Hence, a time which the line is stopped may be shortened, a number of installation spaces in the traveling direction may be decreased and precise notching may be performed, and the welding means does not receive any adverse influence because mechanical vibration occurring during operation of the shearing means does not extend to the welding means.

Further, the shearing apparatus comprises the punching means for punching the strip concurrently with the shearing operation of the strip at a position separated a certain distance from the shearing position. Thus, it is possible to process the hole which is necessary for detecting the weld portion in an after process concurrently with the shearing operation, and a time which the line is stopped may be shortened and, at the same time, a number of installation spaces may be reduced and it is possible to make cost reductions.

Also, the welding means may be laser beam welding. Hence, it is possible to perform precise welding with a narrow weld width and without a broad weld location, and the time which the line is stopped may be shortened because welding is completed in a short period of time.

Moreover, the welding means may be seam welding. Thus, the back end of the preceding strip and the lead end of a succeeding strip are overlapped and welded and the weld is ensured.

Further, the welding means may be arc welding. Thus, the apparatus is simplified and the cost may be reduced, and welding may be completed in a further shorter period of time and the time which the line is stopped may be lessened.

What is claimed is:

1. A strip joining apparatus wherein a back end of a preceding strip and a lead end of a succeeding strip are welded while sheet-shaped strips are moved in a longitudinal direction and both ends of a weld location are side notched after welding, said strip joining apparatus comprising:

a first carriage comprising a shearing means for shearing each of said back end of said preceding strip and said lead end of said succeeding strip in a direction approximately orthogonal to the moving direction of said strips, a welding means for sequentially welding, along a shearing surface, a location where said back end of said sheared preceding strip and said lead end of said sheared succeeding strip are contacted by one of an abutting and an overlapping, and a first side notching means for side notching a first welded seam end portion of said weld location provided approximately above a welded seam direction of said weld location, said first carriage operable to move in said welded seam direction; and a second carriage disposed facing said first carriage and comprising a second side notching means for side notching a second welded seam end portion of said weld location and constituting a pair of side notching means together with said first side notching means.

2. A strip joining apparatus wherein a back end of a preceding strip and a lead end of a succeeding strip are welded while sheet-shaped strips are moved in a longitudinal direction and both ends of a weld location are side notched after welding, said strip joining apparatus comprising:

a first carriage comprising a shearing means for shearing each of said back end of said preceding strip and said lead end of said succeeding strip in a direction approximately perpendicular to the moving direction of said strips, and a first side notching means for side notching a first welded seam end portion of said weld location provided approximately above a shearing surface of said sheared strip, said first carriage is operable to move in a direction of said shearing surface;

a welding means provided separately from said first carriage and between said shearing means and said first side notching means, for sequentially welding a location where said back end of said sheared preceding strip and said lead end of said sheared succeeding strip recontacted by one of an abutting and an overlapping, while moving parallel to said shearing surface; and a second carriage disposed facing said first carriage and comprising a second side notching means for side notching a second welded seam end portion of said weld location and constituting a pair of side notching means together with said first side notching means.

3. The strip joining apparatus according to claim 1 wherein:

said shearing means comprises a punching means for punching a strip concurrently with a shearing operation of said strip at a position separated a certain distance from a shearing position, said strip being one of the sheet-shaped strips.

* * * * *